United States Patent
Cooper et al.

(10) Patent No.: US 9,694,533 B2
(45) Date of Patent: Jul. 4, 2017

(54) METHOD AND DEVICE FOR MANUFACTURING CONTAINERS BY THERMOFORMING

(75) Inventors: Timothy Cooper, L'Haye les Roses (FR); Frédéric Moreau, Corbreuse (FR); Dominique Schwab, Versailles (FR)

(73) Assignee: ERCA, Les Ulis (FR)

( * ) Notice: Subject to any disclaimer, the term of this patent is extended or adjusted under 35 U.S.C. 154(b) by 956 days.

(21) Appl. No.: 13/581,805

(22) PCT Filed: Mar. 11, 2011

(86) PCT No.: PCT/FR2011/050491
§ 371 (c)(1),
(2), (4) Date: Nov. 8, 2012

(87) PCT Pub. No.: WO2011/114043
PCT Pub. Date: Sep. 22, 2011

(65) Prior Publication Data
US 2013/0049250 A1    Feb. 28, 2013

(30) Foreign Application Priority Data

Mar. 17, 2010 (FR) ...................... 10 51900

(51) Int. Cl.
*B29C 51/42* (2006.01)
*B29C 51/26* (2006.01)
(Continued)

(52) U.S. Cl.
CPC ............. *B29C 51/421* (2013.01); *B26F 1/40* (2013.01); *B29C 51/261* (2013.01); *B29C 51/44* (2013.01); *B26D 7/1818* (2013.01); *B26F 1/3846* (2013.01); *B29C 51/18* (2013.01); *B29C 51/34* (2013.01); *B29C 2793/0009* (2013.01);
(Continued)

(58) Field of Classification Search
CPC ...... B26F 2210/11; B26F 1/40; B26F 1/3846; B29K 2105/256; B29C 51/34; B29C 2793/0081; B29C 2793/0009; B29C 2793/0018; B29C 51/18; B29L 2007/002; B26D 7/1818; B29B 11/02
See application file for complete search history.

(56) References Cited

U.S. PATENT DOCUMENTS 3,934,920 A * 1/1976 Rowekamp ............. B65B 21/20
                                                        294/65
4,436,685 A * 3/1984 Emura et al. .................. 264/148
(Continued)

FOREIGN PATENT DOCUMENTS

EP    0 098 420 A2    1/1984
EP    575827 A1 * 12/1993 ............. B21D 43/18
(Continued)

*Primary Examiner* — Jeffrey Wollschlager
*Assistant Examiner* — Armand Melendez
(74) *Attorney, Agent, or Firm* — Eversheds Sutherland (US) LLP

(57) ABSTRACT

The containers are thermoformed at a thermoforming station from blanks cut out from a sheet of thermoplastic material. Before thermoforming the containers, at least some blank zones in the sheet are heated, the hot blanks are cut out from the heated zones and the hot blanks are conveyed to the thermoforming station.

11 Claims, 6 Drawing Sheets

(51) Int. Cl.
  *B26F 1/38* (2006.01)
  *B26F 1/40* (2006.01)
  *B29C 51/44* (2006.01)
  *B26D 7/18* (2006.01)
  *B29C 51/18* (2006.01)
  *B29C 51/34* (2006.01)
  *B29K 105/00* (2006.01)
  *B29L 7/00* (2006.01)

(52) U.S. Cl.
  CPC  *B29C 2793/0081* (2013.01); *B29K 2105/256* (2013.01); *B29L 2007/002* (2013.01)

(56) References Cited

U.S. PATENT DOCUMENTS

| | | | | |
|---|---|---|---|---|
| 4,464,329 | A | * | 8/1984 | Whiteside et al. ............ 264/544 |
| 4,560,339 | A | * | 12/1985 | Padovani ...................... 425/437 |
| 4,607,556 | A | * | 8/1986 | Piggott .......................... 83/511 |
| 5,237,796 | A | * | 8/1993 | Bonkowski .......... B29B 13/023 |
| | | | | 53/398 |
| 6,083,339 | A | * | 7/2000 | Peters .................. B29C 51/002 |
| | | | | 156/245 |
| 6,324,819 | B1 | * | 12/2001 | Kourtoglou .................. 53/559 |
| 6,334,290 | B1 | * | 1/2002 | Reichert et al. ............... 53/559 |
| 7,311,513 | B2 | * | 12/2007 | Schwab et al. ............ 425/387.1 |
| 2004/0245679 | A1 | | 12/2004 | Michelon et al. |
| 2005/0151282 | A1 | * | 7/2005 | Harper .................. B29C 31/008 |
| | | | | 264/1.33 |
| 2008/0036121 | A1 | * | 2/2008 | Gandon et al. ............... 264/516 |
| 2009/0115102 | A1 | | 5/2009 | Minghette |
| 2011/0165281 | A1 | * | 7/2011 | Bissoli ..................... B26F 1/44 |
| | | | | 425/292 |

FOREIGN PATENT DOCUMENTS

| | | |
|---|---|---|
| EP | 1 386 839 A1 | 2/2004 |
| GB | 908 544 A | 10/1962 |
| JP | 60-078422 U | 5/1985 |
| WO | 03/018294 A1 | 3/2003 |
| WO | 2004/106162 A2 | 12/2004 |
| WO | 2007/088161 A2 | 8/2007 |

* cited by examiner

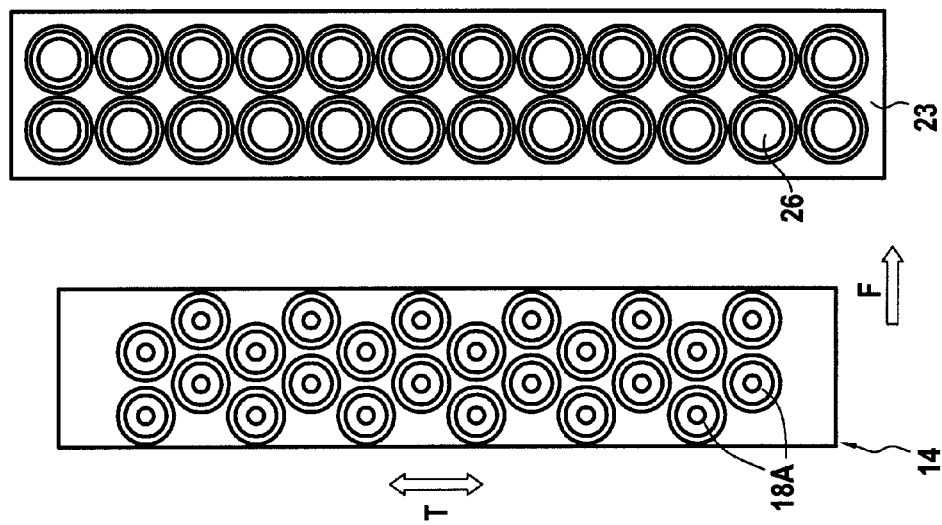
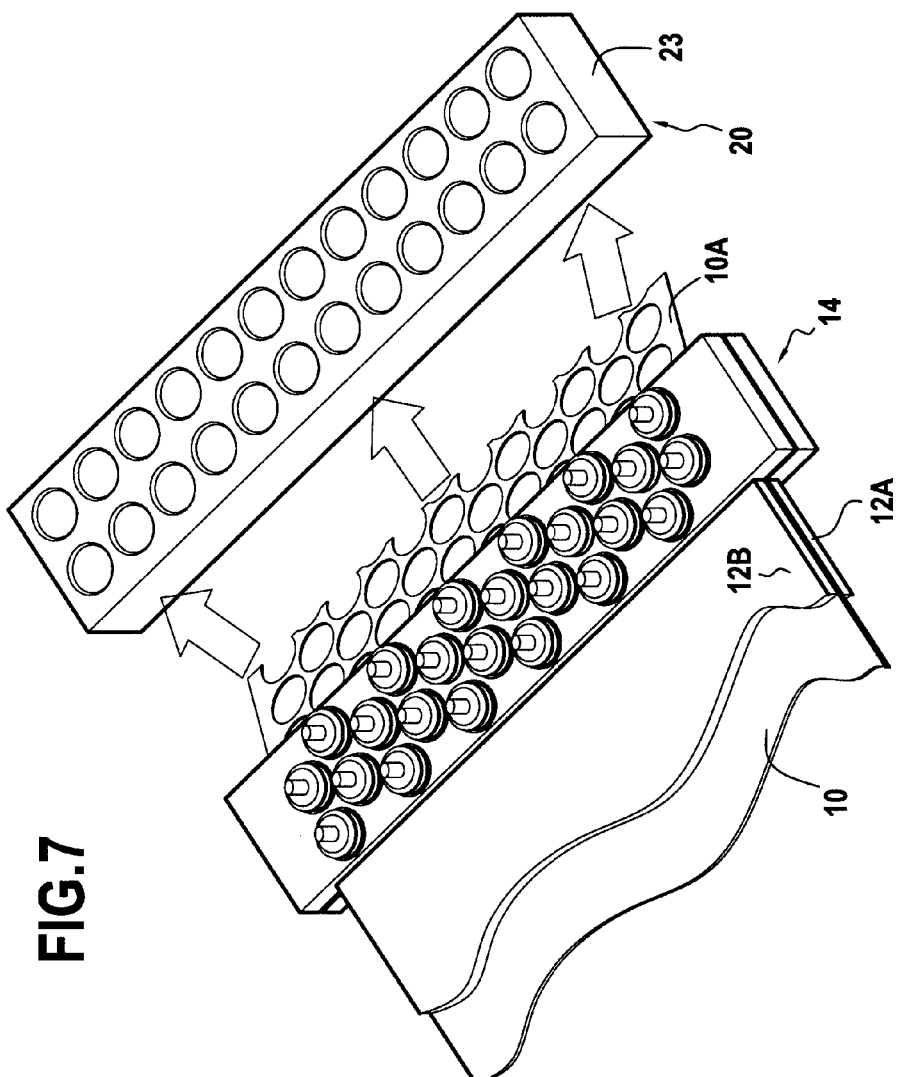

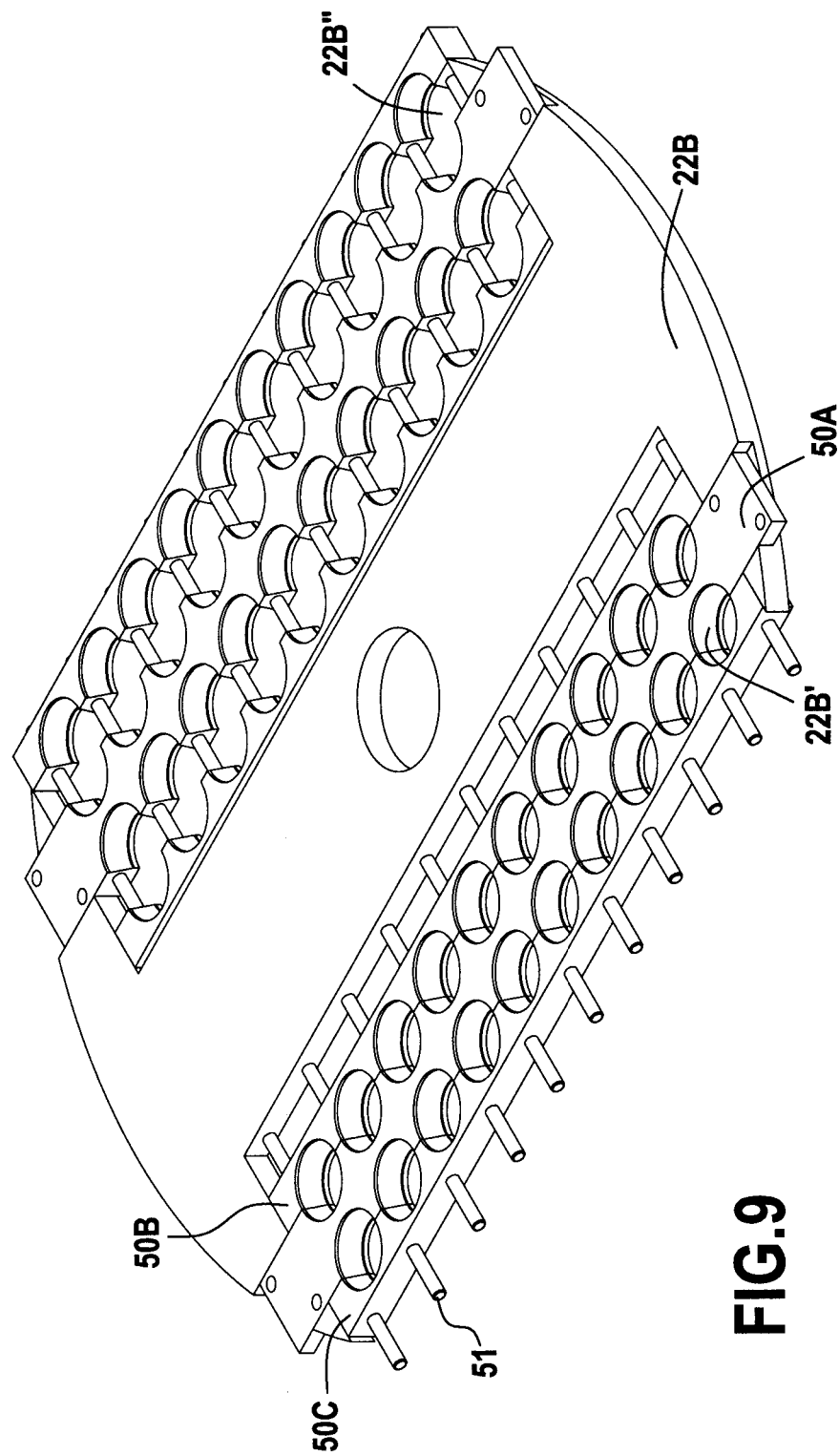

METHOD AND DEVICE FOR MANUFACTURING CONTAINERS BY THERMOFORMING

TECHNICAL FIELD

The present invention concerns a method for manufacturing containers by thermoforming in which, at a thermoforming station, containers are thermoformed from blanks cut from a sheet of thermoplastic material.

BACKGROUND OF THE INVENTION

If the containers are thermoformed directly in a sheet of thermoplastic material significant waste zones are created between these containers on account of the space taken up by the thermoforming moulds and counter-moulds. Document FR 2 827 258, to limit material losses corresponding to these waste zones, recommends stretching said zones before thermoforming. This method is efficient but it requires relatively complex kinematics.

It is also known, for thermoforming, to use pre-cut out blanks. In this case the blanks are placed on a conveyor and conveyed by the latter to a heating station and then to a thermoforming station. However, it is difficult to hold blanks in place correctly whilst fully heating the entirety of their lower and upper surfaces. In general, the supporting thereof does not only affect the edges of the blanks but also affects at least the lower surfaces of the blanks. Document FR 2 842 136 examines this problem and recommends using blank conveying means comprising cells which leave clear the entirety of the upper and lower surfaces. However these cells must be associated with supporting means that are relatively complex to implement.

In addition, document FR 1 554 475 discloses the conveying of a sheet of thermoplastic material to the input of a thermoforming installation, cutting blanks from this sheet and then transferring the blanks to a heating station, and finally transferring the hot blanks to a thermoforming station. The difficulty of heating the entirety of the lower and upper surfaces of the blanks still fully remains in this document.

Also, document JP 60-78422 discloses heating a sheet of thermoplastic material, cutting blanks from this hot sheet and conveying the blanks to a thermoforming station for thermoforming of the containers. Therefore the blanks are perfectly heated in their entirety before thermoforming is carried out. However, this document does not seek to limit material losses in the sheet of thermoplastic material.

Document U.S. Pat. No. 4,436,685 discloses an installation in which thermoforming is carried out by continuous extrusion of a sheet of thermoplastic material. Sections of sheet are cut and reheated then transferred to a thermoforming station for the thermoforming of containers in these sections.

Similarly, this document does not seek to limit losses of material in the sheet or sheets sections of thermoplastic material.

SUMMARY OF THE INVENTION

The present invention concerns a method for manufacturing containers by thermoforming wherein at a thermoforming station, containers are thermoformed from blanks cut from a sheet of thermoplastic material and wherein, before thermoforming the containers, at least some blank zones in the sheet of thermoplastic material are heated, hot blanks are cut out in said heated zones and said hot blanks are conveyed to the thermoforming station.

The objective of the present invention is to improve the aforementioned state of the art by allowing both the limiting of waste zones in the sheet of thermoplastic material and the perfect heating of the entirety of the blanks for thermoforming.

This objective is achieved by means of the fact that a plurality of blanks are cut simultaneously and several blanks are conveyed simultaneously to the thermoforming station and, before positioning these blanks at said station, the space between the blanks is increased.

Therefore, according to the invention, firstly the blank zones are heated before cutting out the blanks from the sheet of thermoplastic material. The sheet can therefore be supported in known manner to heat the entirety of the blank zones. It is only subsequently that these are cut from the sheet and conveyed to the thermoforming station.

In addition, the plurality of blanks can be cut out simultaneously from the sheet leaving a minimum space between them so that the best possible reduction in waste zones is obtained, and they are then simultaneously conveyed to the thermoforming station, being positioned at sufficient distance from each other to allow the thermoforming thereof, even for containers which have an undercut for which the thermoforming mould and counter mould take up much volume.

Advantageously the hot blanks are conveyed to the thermoforming station whilst maintaining the temperature of these blanks.

For this purpose, advantageously, the blanks are brought to the thermoforming station by means of heated gripping means.

By maintaining the temperature it is meant that the thermoforming temperature of the blanks is maintained by holding the blanks by heated holding means. This prevents the blanks from cooling during their transfer from the heating station to the thermoforming station.

The invention also concerns a device for manufacturing containers by thermoforming, comprising a thermoforming station capable of thermoforming containers from blanks cut from a sheet of thermoplastic material, a heating station at which at least some blank zones in the sheet of thermoplastic material are heated, a cutting station located downstream of the heating station to cut out the blanks in said heated zones, and transfer means for conveying the hot blanks to the thermoforming station.

Documents FR 2 827 258, FR 2 842 136, FR 1 554 475, JP 60-78422 and U.S. Pat. No. 4,436,685 disclose devices allowing the implementation of the previously described prior art methods. These devices therefore also have the previously described disadvantages. The objective of the invention is to improve this state of the art by proposing a device allowing both a reduction in the waste zones and the perfect heating of the entirety of the blanks.

This objective is achieved by means of the fact that the thermoforming station comprises a plurality of thermoforming assemblies each comprising a thermoforming chamber and a piston mobile in back-and-forth movement inside a piston liner, and the transfer means comprise a plurality of gripping members able to be brought close to each other to take hold of the blanks at the cutting station, and to be moved away from each other to deposit the blanks in the thermoforming assemblies.

In the device of the invention, the means for cutting out the blanks are located downstream of the heating station, cutting being carried out when the blank zones have been heated. Via the transfer means the hot blanks are then transferred to the thermoforming station.

In addition, the blanks can be cut from the thermoforming sheet very close to one another so as to limit waste in this sheet, and they can then be distanced from each other so that they can be positioned at the thermoforming station at a sufficient distance from each other for easy thermoforming even if the containers have undercuts.

The blanks are cut from the sheet before thermoforming. Not only is the waste from the sheet of limited quantity, since the blanks are cut as close as possible to each other, but also the waste sheet is devoid of any soiling (traces of product poured in the containers or traces of film glue) since it leaves the device as soon as the blanks have been cut out. It can therefore be fully recycled at least cost.

Advantageously the cutting station comprises at least one cutting assembly comprising a cutting tool and counter-tool positioned either side of the sheet of the thermoplastic material, the cutting tool comprising an annular knife.

These cutting means are of simple structure and simple to use.

Advantageously the transfer means comprise at least one gripping member able to take hold of a blank cut out at the cutting station, and which can be moved to extract said blank from the cutting station and convey this blank to the thermoforming station.

Advantageously the gripping member is heated.

For example the gripping member is a suction pad.

By means of this gripping member the cutting station may be of simple design, the blanks being extracted after they have been cut out. The heating of the gripping member prevents cooling of the blanks during their transfer. The choice of a suction pad to form the gripping member corresponds to a structure that is both simple and reliable.

Advantageously the transfer means comprise as many gripping members as cutting assembles, each gripping member being associated with a cutting assembly.

The present invention therefore also concerns a device for manufacturing containers by thermoforming, comprising a thermoforming station which comprises a plurality of thermoforming chambers.

In said device, a plurality of containers are formed simultaneously in the thermoforming chambers and then released from the moulds i.e. removed from these chambers.

Having regard to the fast production rates, it is important that mould release should take place within a minimum lapse of time for those containers which have just been simultaneously thermoformed. If the containers do not have any undercut zones, mould release is generally simple to perform since it can be obtained merely by relative movement of the containers and thermoforming chambers by translation parallel to the direction of thermoforming (which is the direction of movement of the thermoforming pistons).

Mould release is more complicated if the containers have undercut zones. The thermoforming chambers must then have at least two parts which can be moved in relation to each other, perpendicular to the direction of thermoforming.

Also the release of the containers from the moulds must be followed by the transfer thereof to a depositing or filling station.

If the containers are thermoformed in a continuous sheet this transfer is simple to obtain since the sheet needs only to be moved forward to move all the containers which have just been thermoformed and are joined to the sheet.

However, increasingly more often containers are thermoformed from individual blanks to limit losses of material. After they have been simultaneously thermoformed, they are then independent of each other and must be handled individually. Therefore mould release must be accompanied by the individual gripping of each container for the transfer thereof. This complicates mould release and risks increasing the mould release time.

The invention sets out to propose a device for manufacturing containers by thermoforming which, even in the aforementioned situations, allows the easy mould release of the containers without loss of time.

This objective is achieved by means of the fact that the thermoforming station comprises a mould block base having thermoforming cavities and a mould block interface comprising at least two series of interface jackets, the mould block interface able to be moved so that the interface jackets of one series can be placed facing the thermoforming cavities of the mould block base so as to form, with these cavities, thermoforming chambers in which containers can be thermoformed, whilst the interface jackets of the other series are drawn away from the mould block base to allow the disengaging of previously thermoformed containers carried by these interface jackets.

The mould block interface can operate in concurrent operation time, one series of interface jackets able to be used for thermoforming, whilst the other series is used for disengaging containers. Once the containers carried by the jackets of the other series have been ejected from the mould block they can be removed from these jackets with every necessary precaution (especially if they have undercut parts and/or were individually thermoformed) while other containers are being thermoformed. Also, if the containers are thermoformed from individual blanks, the positioning of the blanks at the thermoforming station can take place during the movement of the thermoforming interface during which the positions of the series of thermoforming jackets are reversed.

Advantageously the interface jackets can assume a tight configuration for thermoforming and an expanded configuration for disengaging the containers.

The interface jackets in tight configuration can therefore be used not only for thermoforming but also for conveying the containers which have just been thermoformed when the corresponding series moves from its position used for thermoforming to its position used for disengaging the containers. In this position used for disengaging, the jackets can be expanded to allow easy disengaging of the containers.

BRIEF DESCRIPTION OF THE DRAWINGS

The invention will be better understood and its advantages will become better apparent on reading the following detailed description of one embodiment given as a non-limiting illustration. The description refers to the appended drawings in which:

FIG. 6 illustrates the organisation firstly of the zones of blanks in the thermoforming sheet and secondly of the thermoforming chambers;

FIG. 7 is a perspective view at the cutting station area and thermoforming station area;

FIG. 9 is a perspective view of the thermoforming interface.

DETAILED DESCRIPTION OF THE INVENTION

Figure 1:
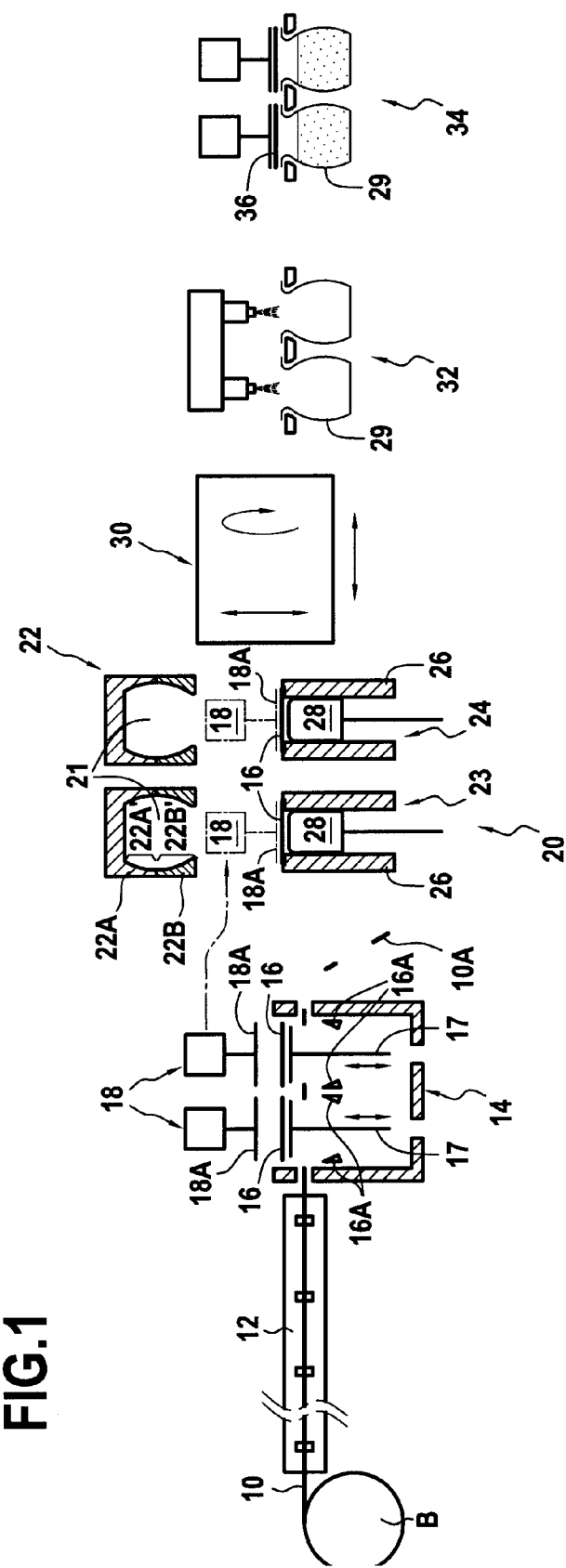
FIG. 1 is a schematic side view of a device according to the invention allowing the implementation of the method of the invention.

The different elements of the device of the invention are described with reference to FIG. 1, from upstream to downstream. The device comprises a bobbin B from which a sheet of thermoplastic material 10 is unwound, which moves forward step by step driven by means known per se. The sheet 10 passes into a heating station 12 in which at least some zones of blanks are heated in the sheet 10. The sheet then passes to the cutting station 14 where blanks 16 are cut out in these heated zones.

The device also comprises transfer means 18 which allow the hot blanks to be brought to a thermoforming station 20. To cut out a blank, the cutting station comprises a cutting assembly having a cutting tool comprising an annular knife 16A or punch, and a cutting counter-tool not illustrated in FIG. 1. It also comprises a blank supporting core 17 which is located inside the annular knife 16A and is able to carry a cut-out blank.

As will be understood from FIG. 1, the blank supporting core 17 can be moved back and forth perpendicular to the sheet 10, to carry the blanks 16 beyond the cutting edge of the knife 16A. The transfer means 18, to grasp hold of each blank, comprise a gripping member 18A which is capable of taking hold of the blank 16 cut out at the cutting station 14 and of being moved so as to extract the blank from the cutting station and to transfer this blank to the thermoforming station 20.

It is seen that downstream of the cutting station 14 a waste sheet 10A remains of the thermoplastic sheet 10.

In manner known per se the thermoforming station 20 comprises a plurality of thermoforming assemblies each comprising a thermoforming chamber 21, formed in a mould block 22, and a piston 28 movable back and forth in a piston liner 26 formed in a counter-mould 23. In this case, it can be seen that the thermoforming chambers 21 allow the forming of containers having an undercut.

The device also comprises means 30, not illustrated in detail, for taking hold of the containers thermoformed at the thermoforming station 20 and for transferring these containers to a filling station 32, where the product these containers are intended to contain (in particular a food product of paste or liquid type) is portioned into these containers. Downstream of the filling station 32, the device comprises a sealing station 34 where films 36 are arranged over the openings of the containers 29 and sealed across these openings.

With reference to FIGS. 2 to 5, a description is now given in more detail of the conformation of the cutting station and of the transfer means for transferring the cut-out blanks. In these Figures the heating unit of the heating station 12 can be seen which, as is conventional comprises two parts respectively 12A and 12B located either side of the sheet and capable of being drawn close to each other so that they lie flat against the lower and upper surfaces of the sheet. The active faces of these two parts, respectively the upper face of the lower part 12A and the lower face of the upper part 12B, have clearance areas 13 where said active faces are not in contact with the thermoplastic sheet 10. Therefore the sheet is only brought to the temperature of thermoplastic deformation between these clearance areas 13. Advantageously said areas 13 are organised so as to form annular cells between which zones 10' of blanks are delimited which are the zones heated at the heating station 12.

The cutting station 14 located downstream of the heating station 12 comprises a plurality of cutting assemblies each used to cut out a blank in a heated zone 10' of the sheet of thermoplastic material 10. It will be understood that each cutting assembly comprises a cutting tool which comprises an annular knife or punch 16A, and a cutting counter-tool 16B. The tool and counter-tools are located either side of the sheet of thermoplastic material. Here the counter-tool 16B also cooperates with an opposite-facing tool 16B', located on the other side of the sheet to pinch the sheet between them to aid cutting by movement of the annular knives perpendicular to the plane of the sheet. Here the annular knives are located underneath the sheet so that it is their upward movement which causes cutting.

It can also be seen in FIGS. 2 to 5 that the cutting assembly, for each blank, comprises a blank supporting core 17 which is located inside the annular knife 16A and which is capable of carrying a cut-out blank 16. This blank supporting core 17 can be moved perpendicular to the plane of the sheet with back-and-forth movement to extract the cut-out blanks. To transfer a cut-out blank from the cutting station 14 to the thermoforming station 20, the device comprises transfer means having a gripping member 18A which is capable of taking hold of a cut-out blank at the cutting station and of being moved so as to extract this blank from the cutting station and to transfer it to the thermoforming station.

FIGS. 2 to 5 allow good understanding of the sequences of movement of the cutting means and transfer means.

Figure 2:
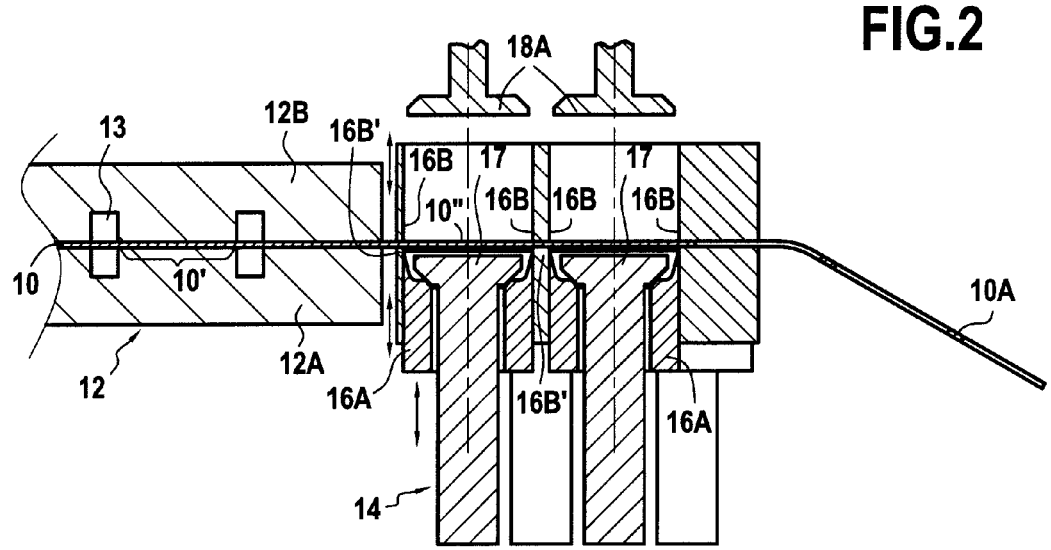
FIGS. 2 to 5, in four successive situations, show the configuration of the cutting station and also illustrate part of the transfer means for conveying these blanks to the heating station.

In FIG. 2, a non-cut portion of the sheet has just been brought to the cutting station 16, and the heated zones 10' are located in the annular space of the knives 16A. A waste zone 10A of the sheet has just left the cutting station 16 via the forward movement of this sheet. To allow the forward travel of the sheet, the cutting counter-tools 16B and the opposite-facing tools 16B' have been slightly drawn apart.

In FIG. 2, these counter-tools and opposite-facing tools have moved back towards each other so as to pinch the sheet 10 between them and it can be seen that the knives 16A are still very slightly withdrawn relative to the underside surface of the sheet. The gripping members 18A have been moved upwards away from the cutting counter-tools 16B. The blank supporting cores 17 are slightly withdrawn downwards inside the knives 16A, a rest position that they assume to clear the way for travel of the sheet through the cutting station.

Figure 3:
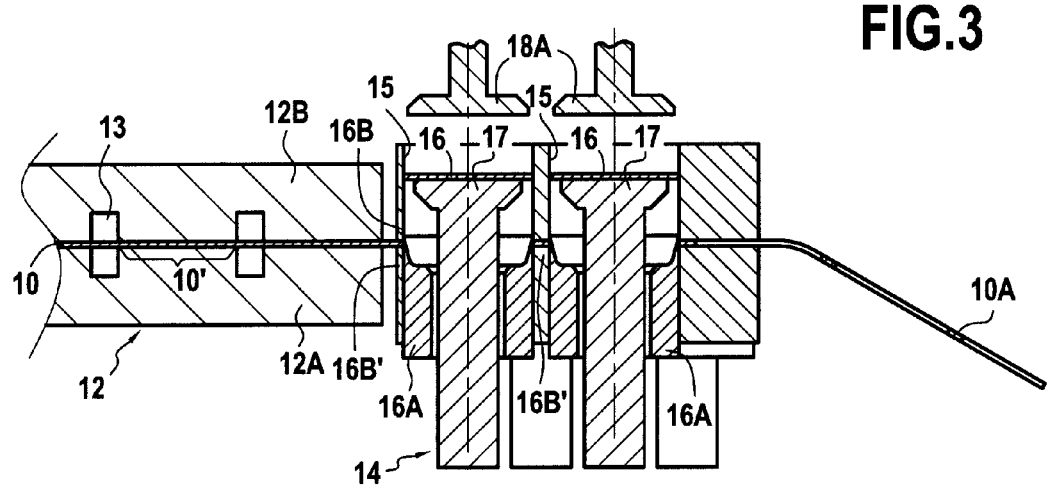

In FIG. 3, blanks 16 have just been cut from the sheet of thermoplastic material, it can be seen that the annular knives 16A lay in upper position their cutting edges having just left the plane of the sheet of thermoplastic material 10. Immediately after this cutting, the blank supporting cores 17 have been moved upwards and it can be seen that they carry the cut-out blanks 16 in the cylindrical jackets 15 formed inside the cutting counter-tools 16B. In this situation, the gripping members 18A are still withdrawn upwards relative to the cutting counter-tool 16B.

Figure 4:
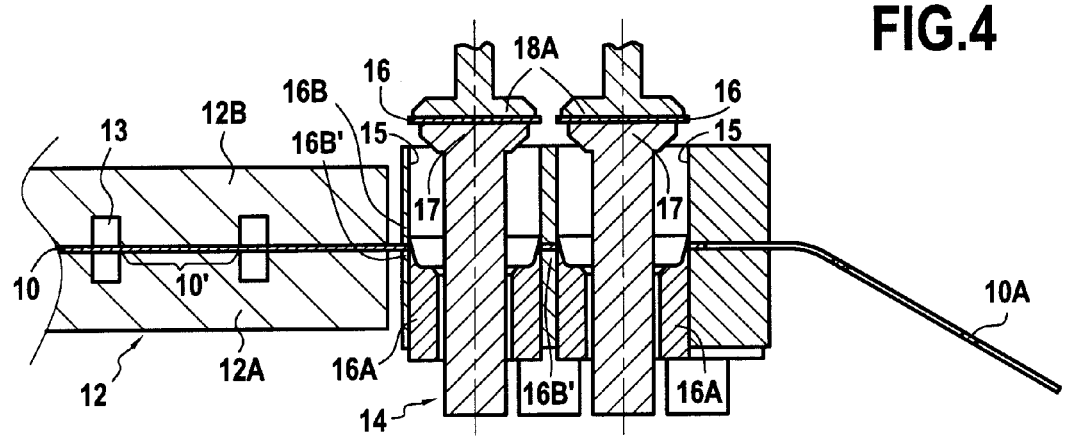

In FIG. 4, the blank supporting cores 17 have been moved further upwards so that the jackets 15 emerge to bring the blanks 16 in contact with the gripping members 18A.

Figure 5:
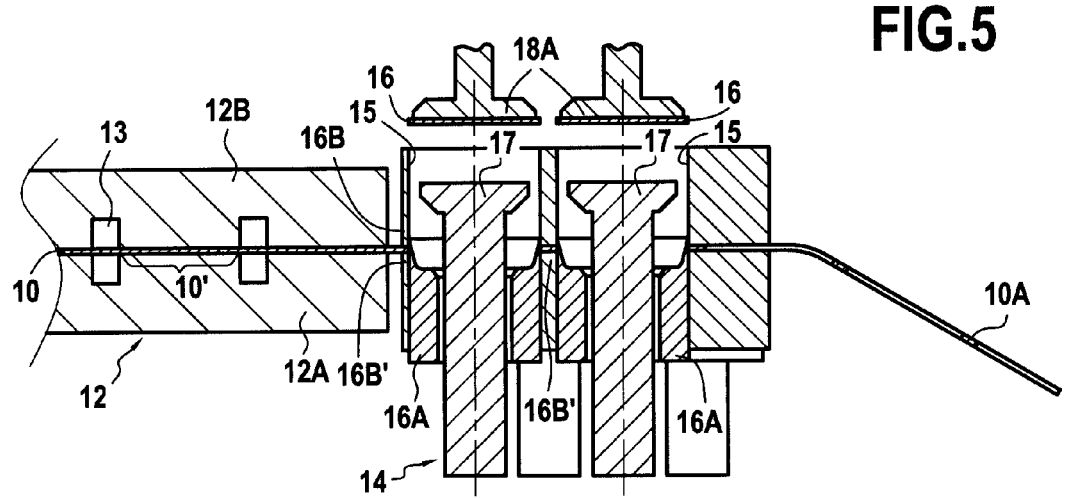

In FIG. 5, the gripping members 18A have taken hold of the blanks 16 brought towards them whilst the blank supporting cores are in the progress of being lowered into the jackets 15 to return to their positions illustrated in FIG. 2. At the same time, the annular knives 16A are also lowered to free the forward movement of the sheet of thermoplastic material 10, and the cutting counter-tools 16B and opposite-facing tools 16B' are slightly drawn apart to allow the forward travel of the sheet.

It will be understood that in the illustrated example, the gripping members remain in fixed vertical position at the cutting station since it is only via an upward movement of the blank supporting cores that the blanks are brought up to these gripping members. However, the reverse situation could also be designed, in which the blank supporting cores 17 remain practically fixed in vertical position while each gripping member 18A is lowered into a jacket 15 to take hold therein of a blank that has just been cut out.

Preferably at least one of the elements formed by the blank supporting core 17 and the knife 16A is heated to prevent cooling of the blanks while they are being cut out. It is also preferable that the gripping members 18A should be heated to prevent cooling of the blanks during their transfer from the cutting station to the thermoforming station.

It is advantageous that the gripping member 18A should be in suction pad form, acting by aspirating air. This suction pad may be in the shape of a flat disc provided on its annular periphery with a seal e.g. a seal in silicon withstanding high temperatures. It is sufficient to cause slight air suction at the underside surface of the gripping member delimited inside the aforementioned seal so that the blanks remain held against this underside surface.

It will be understood that the transfer means comprise as many gripping members 18A as the cutting station 14 comprises cutting assemblies, each gripping member being associated with a cutting assembly. In the illustrated example, along a vertical section parallel to the direction from upstream to downstream of the device, two cutting assemblies are illustrated and two gripping members, therefore illustrating the cutting and transfer of two blanks. Advantageously, the aforementioned means are organised in groups of two, the groups being arranged one after the other in the direction transverse to the travel of the sheet.

This organisation will easily be understood with reference to FIG. 6 in which the direction of travel of the sheet is indicated by the arrow F. This Figure, on the left side, shows the cutting station 14 and in this schematic overhead view the arrangement can be seen of the different gripping members 18A. To minimize waste in the sheet, it is to be understood that the blanks are cut as close as possible to each other. In other words, the different cutting assemblies each used for simultaneous cutting of a blank are arranged as close as possible to one another. With reference to the left side of FIG. 6 it will be seen that the successive groups of cutting assemblies arranged one after the other in the transverse direction T have a staggered organisation.

The right side of FIG. 6 shows the organisation of the thermoforming chambers. In the example illustrated in FIG. 1, as will also be described with reference to FIG. 8, the containers are thermoformed upwardly i.e. the mould block 22 is arranged above the counter-mould 23. FIG. 6 is taken along a horizontal plane located between the mould and the counter-mould as seen from overhead, so that the right side in this Figure shows the upper surface of the counter-mould 23, with the liners 26 inside which the thermoforming pistons move. Evidently, the arrangement of these liners 26 corresponds to the arrangement of the thermoforming chambers 21 in vertical alignment. In other words, for thermoforming conducted downwardly, it can be considered that the organization within the right side in FIG. 6 is also the organisation of the thermoforming chambers.

It can be seen that the thermoforming chambers are organised in two rows transverse to direction F, and are much more spaced apart than the cutting assemblies. Therefore the gripping members 18A are formed individually i.e. one member per blank, and can be moved relative to each other so that they can be drawn close to take hold of the blanks at the cutting station 14 and drawn apart to place the blanks in the thermoforming assemblies.

The respective organisations of the cutting assemblies and thermoforming assemblies are also indicated in the perspective view in FIG. 7, the arrows showing the movement of the gripping members allowing the blanks to be distanced from each other during their transfer between the cutting station 14 and the thermoforming station 20.

Figure 8:
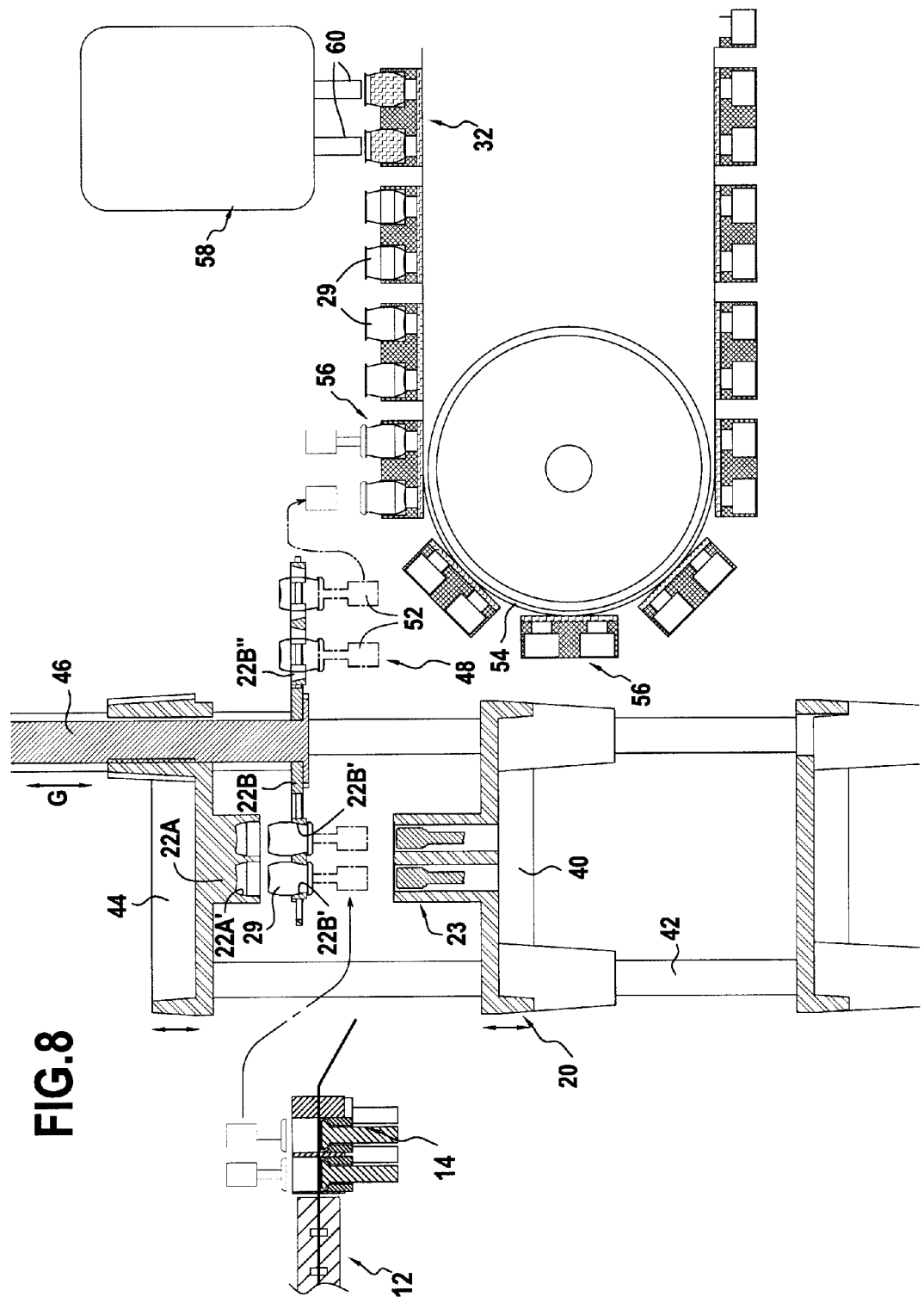
FIG. 8 is a side view of the device according to the invention allowing better understanding of the conformation of the thermoforming station showing in particular that the mould block comprises a mould base and a thermoforming interface.

With reference now to FIG. 8 a description is given of the organization of the thermoforming station 20. In this Figure can be seen the downstream part of the heating station with the heating unit 12, the cutting station 14, the thermoforming station 20 and the filling station 32. The counter-mould 23 is arranged on lower bed-plate 40 of the thermoforming station 20, this bed-plate being mobile vertically back-and-forth guided by rods 42. The mould block comprises a mould block base 22A which is carried by an upper bed-plate 44 also mobile vertically back-and-forth being guided by rods 42.

This mould block base has thermoforming cavities 22A' also illustrated in FIG. 1.

The mould block also comprises a mould block interface 22B which, as can be better seen in FIG. 9, comprises at least two series of interface jackets respectively 22B' and 22B". The interface jackets of each of the two series can be arranged alternatively opposite the thermoforming cavities 22A' to form therewith the thermoforming chambers 21 (in the illustrated situation, it is the interface jackets of the first series 22B' which are arranged opposite the cavities 22A'), or in a position drawn away from the mould block base 22A to allow the disengaging of previously thermoformed containers. In FIG. 8, the interface jackets of the first series 22B' are arranged opposite the thermoforming cavities 22A' but, by downward movement of the mould block interface 22B, they have been drawn vertically away from these cavities 22A' to carry with them the containers 29 which have just been thermoformed thereby releasing them from the moulding cavities 22A'. From this lowered position, the mould block interface 22B can be pivoted on a horizontal plane by rotation of its pivoting support rod 46 thereby bringing the jackets of series 22B', carrying containers 29B, to the position of the jackets of the second series 22B".

In the case illustrated the mould block interface comprises two series of interface jackets which are symmetrical relative to a transverse axis passing through its axis of rotation, and hence distanced by angle of 180°. It is possible to have two, three or four series of jackets, preferably arranged at regular angular distances.

With reference to FIG. 9, it can be seen that the interface jackets are able to assume a tight configuration for thermoforming and an expanded configuration to disengage the containers. In this Figure the interface jackets 22B' of the first series are in tight configuration which is used not only for thermoforming but also for mould release of the containers 29 from the thermoforming cavities 22A' and to hold these containers in these jackets 22B' during the movement of the mould block interface 22B to bring said jackets 22B' opposite the transfer means 48 (see FIG. 8) allowing the transfer of the containers to the filling station 32.

In FIG. 9 the interface jackets 22B" are in expanded mode which, by means of the aforementioned transfer means 48, allows the containers to be disengaged from these jackets. Here the interface jackets are formed of two parts each delimiting one half of their circumference and which can be moved relative to each other.

Here the interface jackets of each series being organised in two rows, the mould block interface 22B comprises a central bar 50A which is fixed relative to said interface and which, on its two opposite sides, delimits one half of the circumference of the jackets of each of the two rows. Either side of this central bar, the mould block interface for each series comprises a side bar respectively 50B and 50C. These side bars 50B and 50C can be moved relative to the central bar by translation over the plane of the mould block interface being guided by guides 51.

With reference to FIG. 8, a description is now given of the transfer of the containers from the mould block interface as far as the filing station. As indicated previously, the device comprises transfer means 48 having gripping members 52 (1 per container 29) which can take hold of each container when it is disengaged from an interface jacket. The transfer means also comprise a conveyor 54 having supporting blocks 56 in which the containers can be placed in two transverse rows. For example the gripping members 52 comprise suction pads which enter inside the containers and adhere to their bottom surface. Since the containers here are thermoformed upwardly, the suction pads are arranged on pivoting means to invert these containers and on means mobile in translation so that they come to lie opposite a supporting block 56 and can deposit the inverted containers thereupon.

Advantageously the supporting blocks 56 have cells in which the containers can be arranged so that they are held in position. The supporting blocks 56 are conveyed on the conveyor 54 to the filling station 32. This station comprises a tank 58 of filling product (in particular a paste or liquid food product) and filling nozzles 60.

The sheet of thermoplastic material from which the blanks are cut out is a thermoplastic material such as polystyrene or, advantageously polypropylene. It has a thickness of the order of 2 to 3 mm for example, in particular of the order of 2.2 mm.

It should be apparent that the foregoing relates only to the preferred embodiments of the present application and the resultant patent. Numerous changes and modifications may be made herein without departing from the general spirit and scope of the invention as defined by the following claims and the equivalents thereof.

We claim:

1. A device for manufacturing containers by thermoforming from a sheet of thermoplastic material moved step by step from upstream to downstream, the device comprising, from upstream to downstream, a heating station where a plurality of delimited blank zones in the sheet of thermoplastic material are heated, a cutting station having cutting assemblies to simultaneously cut out adjacent individual blanks in said heated zones of the sheet, and a thermoforming station comprising a plurality of thermoforming assemblies each comprising a thermoforming chamber and a piston mobile back-and-forth in a piston liner, a spacing between the thermoforming assemblies being higher than a spacing between the cutting assemblies and the device comprising a plurality of individual gripping members configured to adopt a first state in which a spacing between said gripping members corresponds to a spacing between the cutting assemblies, to simultaneously take hold of individual blanks at the individual cutting assemblies in said first state, to be drawn apart to a second state at which a spacing between the gripping members corresponds to a spacing between the thermoforming assemblies and to simultaneously deposit the individual blanks in the thermoforming assemblies, and wherein the gripping members are heated.

2. The device as claimed in claim 1, wherein the cutting station comprises at least one cutting assembly comprising a cutting tool and a cutting counter-tool located on either side of the sheet of thermoplastic material, the cutting tool comprising an annular knife.

3. The device as claimed claim 2, wherein said cutting assembly comprises a blank supporting core located inside the annular knife and capable of carrying a cut-out blank.

4. The device as claimed in claim 3, wherein the blank supporting core can be moved back and forth perpendicular to the sheet to carry the cut-out blanks beyond a cutting edge of the knife.

5. The device as claimed in claim 3, wherein at least one of the elements formed by the blank supporting core and the knife is heated.

6. The device as claimed in claim 1, wherein the gripping members are capable of taking hold of cut-out blanks at the cutting station and of being moved to extract said blanks from the cutting station and to convey the blanks to the thermoforming station.

7. The device as claimed in claim 6, wherein the gripping members comprise suction pads.

8. The device as claimed in claim 2, wherein the cutting counter-tool comprises a cylindrical jacket, inside which one of the gripping members is able to be moved.

9. The device as claimed in claim 2, comprising as many gripping members as the cutting station comprises cutting assemblies, each gripping member being associated with a cutting assembly.

10. The device as claimed in claim 1, wherein the thermoforming station comprises a mould block base having thermoforming cavities and a mould block interface comprising at least two series of interface jackets, the mould block interface able to be moved so that the interface jackets of one series are able to be placed facing thermoforming cavities of the mould block base so as to form, with these cavities, thermoforming chambers in which containers can be thermoformed, whilst the interface jackets of the other series are drawn away from the mould block base to allow the disengaging of containers previously thermoformed carried by these interface jackets.

11. The device as claimed in claim 10, wherein the interface jackets can assume a tight configuration for thermoforming and an expanded configuration for disengaging the containers.

* * * * *